United States Patent

Bobeck

[15] 3,644,908

[45] Feb. 22, 1972

[54] DOMAIN-PROPAGATION ARRANGEMENT

[72] Inventor: Andrew Henry Bobeck, Chatham, N.J.

[73] Assignee: Bell Telephone Laboratories, Incorporated, Murray Hill, N.J.

[22] Filed: June 29, 1970

[21] Appl. No.: 50,778

[52] U.S. Cl. ..............340/174 TF, 340/174 SR, 340/174 ZB

[51] Int. Cl. ....................................G11c 19/00, G11c 11/14

[58] Field of Search ............................................340/174 TF

[56] References Cited

UNITED STATES PATENTS 3,516,077 6/1970 Bobeck et al. ...................340/174 TF

*Primary Examiner*—James W. Moffitt

*Attorney*—R. J. Guenther and Kenneth B. Hamlin

[57] ABSTRACT

An arrangement for moving single-wall domains is described which employs an in-plane magnetic field to incline a domain from alignment with an axis of preferred magnetization of the material in which it is moved. As the in-plane field reorients, the orientation of the inclination changes. The changing domain inclination is converted to domain translation along an axis defined by a magnetic overlay in which a permanent magnetic pattern is printed.

11 Claims, 8 Drawing Figures

INVENTOR
A. H. BOBECK
BY Herbert M. Shapiro
ATTORNEY

DOMAIN-PROPAGATION ARRANGEMENT

FIELD OF THE INVENTION

This invention relates to data-processing arrangements and, more particularly, to such arrangements including a material in which single-wall domains can be moved.

BACKGROUND OF THE INVENTION

A single-wall domain is a magnetic domain encompassed, in the plane of a sheet or slice material in which it can be moved, by a domain wall which closes on itself to form a stable entity free to move in the plane. A typical material for such an arrangement is a rare earth orthoferrite or a garnet crystal having a preferred direction of magnetization along an axis out of the plane of movement, nominally normal to the plane. It is convenient to designate one direction along that axis (viz, the positive direction) as the direction of the magnetization of the domain, the remainder of the material having its magnetization in the negative direction. Such a convention permits a domain to be represented as an encircled plus sign in a field of negative signs or simply as a circle. A single-wall domain and an arrangement for manipulating such domains are disclosed in U.S. Pat. No. 3,460,116 of A. H. Bobeck, U. F. Gianola, R. C. Sherwood, and W. Shockley, issued Aug. 5, 1969.

Single-wall domains in such a sheet of material are constrained to a given diameter typically by a bias field of a polarity to constrict domains—a negative polarity according to the assumed convention. Domains are moved in the sheet by a field (viz, a field gradient) which is provided in positions consecutively offset from the position occupied by a domain.

Field gradients for moving domains are provided generally by pulses applied to an array of conductor loops adjacent the surface of the sheet. By pulsing a succession of conductors consecutively offset from the position occupied by a domain, consecutively offset gradients are established for causing domain displacement. In practice, the conductors are interconnected serially in three sets to provide a familiar three-phase shift register operation for domain patterns. A propagation arrangement of this type is disclosed in U.S. Pat. No. 3,460,116, supra.

An alternative arrangement for providing suitable field patterns for moving domains includes a repetitive overlay pattern on the surface of the sheet. The overlay comprises a magnetically soft material which exhibits a magnetic pole separation in the presence of a magnetic field in the plane in which domains are moved. The poles move as the in-plane field reorients thereby attracting domains to consecutive positions depending on the geometry of the overlay. One such arrangement employing bar and T-shaped overlay elements responds to a rotating in-plane field is disclosed in copending application Ser. No. 732,705, filed May 28, 1968 for A. H. Bobeck, now U.S. Pat. No. 3,534,347.

BRIEF DESCRIPTION OF THE INVENTION

In weakly anisotropic crystals such as garnets, an in-plane field is observed to incline a domain from its nominal orientation normal to the plane of movement. As the in-plane field rotates, the direction of inclination rotates to follow the rotating field. An overlay having a coercive force sufficiently high to be only negligibly affected by the in-plane field and of a proper magnetic configuration converts the changing domain inclination into domain displacement along a channel.

In one embodiment of this invention a relatively high coercive force overlay is formed on each of the top and bottom faces of a slice of material in which domains are moved. Each overlay has an undulating or scalloped edge aligned along an axis of a domain-propagation channel. The edges of the top and bottom overlays, moreover, are permanently magnetized to present repelling poles to opposite ends of a domain. Opposite ends of a domain, alternately are forced by the in-plane field into consecutive recesses of the scalloped overlays, leaving, in each instance, one end of the domain free to move, thus effecting displacement of the domain along the channel.

DETAILED DESCRIPTION

Figure 1:
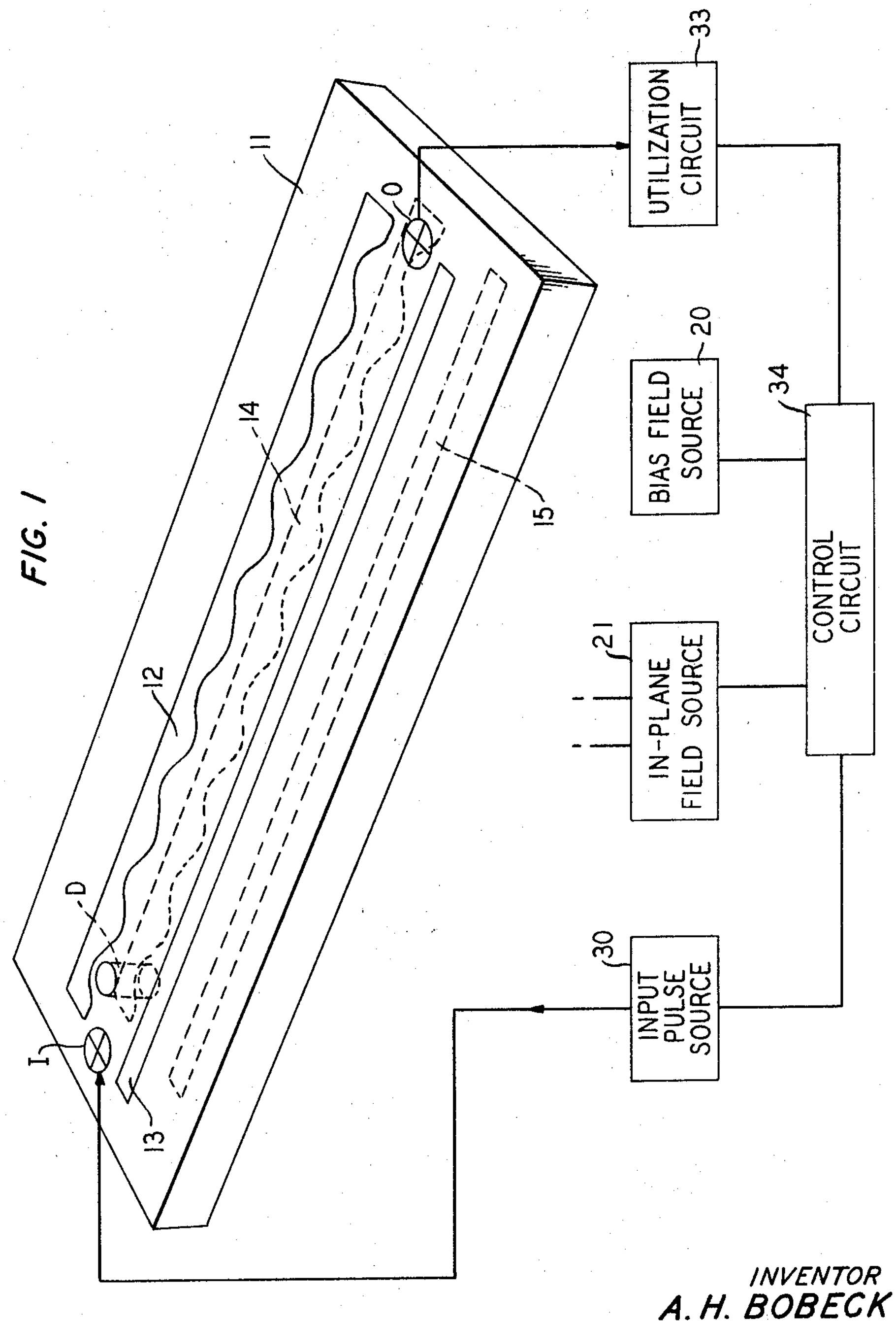
FIG. 1 is a schematic illustration of a domain-propagation arrangement in accordance with this invention.

FIG. 1 shows a domain-propagation arrangement in accordance with this invention. The arrangement comprises a sheet or slice of material 11 in which single-wall domains can be moved.

A propagation channel for domains is defined in slice 11 illustratively by overlay elements 12, 13, 14, and 15. Elements 12 and 13 are on the top surface of slice 11 as viewed in FIG. 1; elements 14 and 15 are on the bottom surface as indicated by the broken lines representing those elements. The elements extend between input and output positions represented by encircled X marks designated I and O, respectively.

A domain D is shown in FIG. 1 occupying a space in slice 11 between the overlay elements on the surfaces of the slice. In the absence of an in-plane field and in the presence of a bias field, domain D assumes an orientation nominally normal to the plane and has a diameter determined by the bias field. The bias field is supplied by familiar means represented by block 20 in FIG. 1.

Similarly, a means for supplying a rotating in-plane field is represented by block 21 in FIG. 1. In the presence of the in-plane field, the attitude of domain D is inclined from the normal to slice 11 as shown, for example, in FIG. 2. Moreover, as the in-plane field rotates, the top and bottom faces, $D_t$ and $D_b$, of domain D sweep out imaginary annuli on the respective surfaces of slice 11 as indicated by the annuli 22 and 23 of FIG. 3. The bias and in-plane fields are represented by arrows so designated in FIG. 3. The vector sum of the two fields aligns the domain as shown. It is helpful to visualize the sweeping out of the annuli as arrow $H_{in\text{-}plane}$ rotates.

Figure 3:
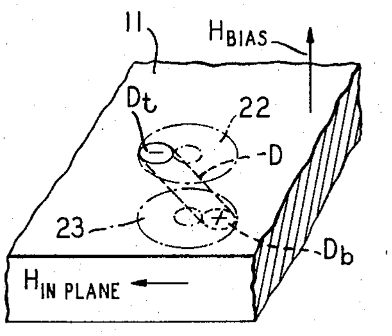
FIG. 3 is a projection view of an imaginary magnetic domain showing orientations thereof during operation of the arrangement of FIG. 1.

In the absence of an overlay, domains as shown in FIG. 3 continue to move about the imaginary annuli shown as the in-plane field rotates. The magnitude of the in-plane field is chosen with respect to the slice anisotropy to permit such movement. For familiar values of in-plane fields as, for example 20 oersteds, garnet slices such as gadolinium-terbium-garnet ($Gd_{2.3}Tb_{0.7}Fe_5O_{12}$) about 0.002 inches thick have sufficiently low anisotropies of about 500 oersteds to permit such operation.

An overlay of the type shown in FIG. 1, on the other hand, converts such domain movement into domain displacement along a channel in slice 11. This operation may be understood in connection with FIGS. 4–8 which show overlay elements 12, 13, 14, and 15 of FIGS. 1 and 2. The domain intersection with the top surface of slice 11 is represented as a circle. The intersection with the bottom surface is represented as a broken circle. It is important to bear in mind that the two circles are not coincident (in a top view) and this noncoincidence is exaggerated in the figures.

Domain D is shown in an assumed starting position corresponding to the position of domain D shown in FIG. 1. We will designate the top of the domain as negative and the bottom as positive and will assume that overlay elements 12 and 13 and overlay elements 14 and 15 are negative and positive respectively. Each end of domain D is repelled by the poles on each overlay on the associated surface of slice 11 and thus assumes some equilibrium position there between.

Figure 4:
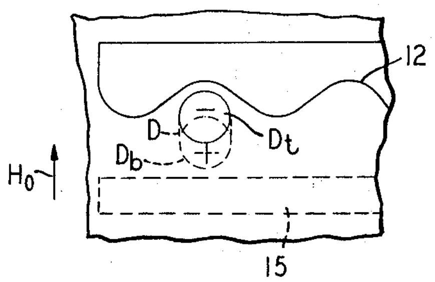
FIGS. 4, 5, 6, 7, and 8 are top views of the portion of FIG. 2 showing consecutive magnetic conditions therein during operation.

The description of the operation is initiated with the provision of an in-plane field at an assumed zero orientation. Arrow $H_o$ in FIG. 4 represents such a field and its direction. The negative (top) end $D_t$ of domain D is displaced in the direction of the field; the positive (bottom) end $D_b$ of domain D is displaced away from the direction of the field. This displacement of the ends of domain D is illustrated by the relative positions of the closed and broken circle in FIG. 4.

Figure 5:
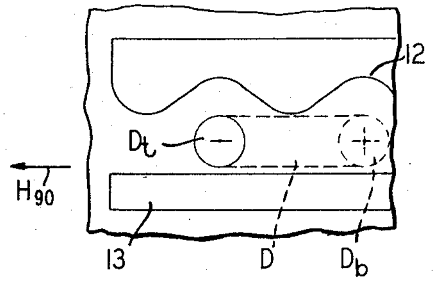

The in-plane field is assumed to be rotating counterclockwise, reorienting 90° to the left as indicated by the arrow $H_{90}$ in FIG. 5. During this quarter cycle, the ends $D_t$ and $D_b$ of domain D tend to sweep out portions of the corresponding annuli, 22 and 23 of FIG. 3, in the absence of overlays, moving to the positions shown in FIG. 5. In the presence of overlays, however, the positions of FIG. 5 are reached but the path is modified.

It is clear, for example, that end $D_b$ moves more than does end $D_t$. The in-plane field ($H_o$) is in a direction to urge a first end ($D_t$) of a domain into a recess in the overlay. The magnetic condition of the overlay is such as to repel the domain. The end of the domain in a recess in the overlay experiences an increase in the repelling force on it if it tries to advance along the channel before being free of the recess and thus, is constrained or latched. The second end of the domain ($D_b$) is free to move. In the illustrative embodiment, the second end is displaced along straight edge overlay 15 of FIG. 2, rather than via an annular path, to the position shown in FIG. 5.

Figure 2:
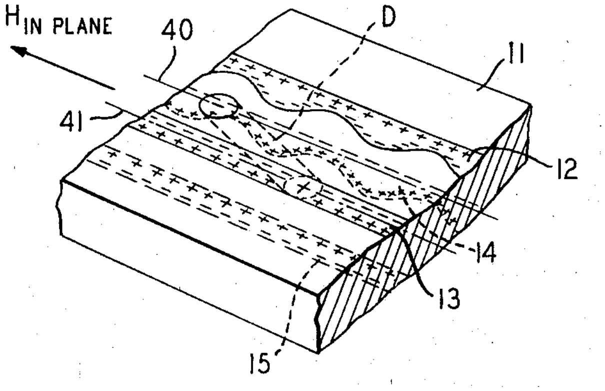
FIG. 2 is a projection view of a portion of the arrangement of FIG. 1 partially in phantom showing the magnetic condition therein during operation.
Figure 6:
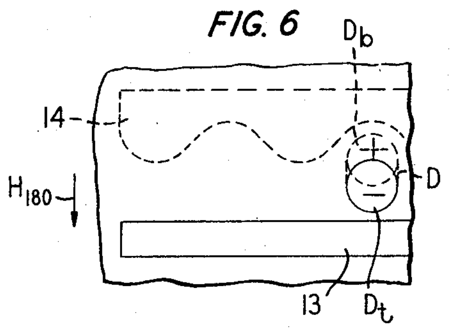
Figure 7:
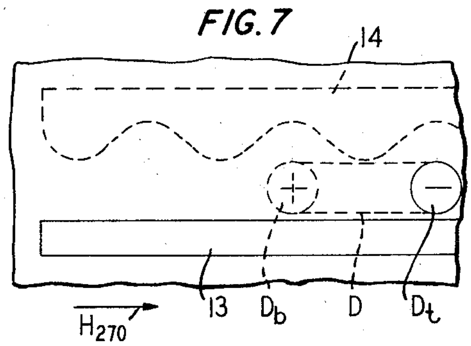

When the in-plane field reorients 90° further to the direction shown by arrow $H_{180}$ of FIG. 6, end $D_b$ of domain D occupies a recess of overlay 14 of FIG. 2 and is constrained. End $D_t$ moves along straight edge overlay 13 as shown in FIGS. 6 and 7 as the in-plane field reorients to the position indicated by arrow $H_{270}$ in FIG. 7.

Figure 8:
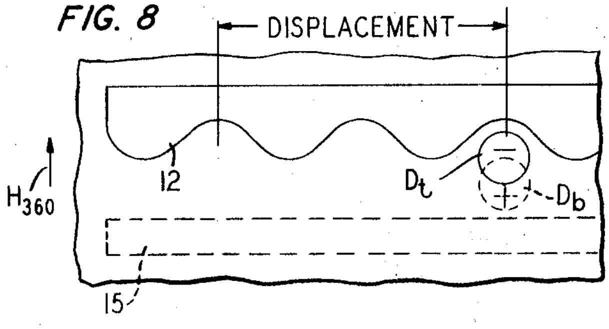

FIG. 8 shows arrow $H_{360}$ directed as shown for arrow $H_o$ in FIG. 4 indicating the completion of one cycle of the in-plane field. Domain D is displaced two repeat patterns of overlay 12 as indicated in the figure. The top and bottom ends of the domain are disposed as originally described with respect to one another.

Information is stored in the propagation channel of FIG. 1 at the input position I as the presence (binary one) and absence (binary zero) of domains. A domain is selectively provided at the input position conveniently by separation from a source of domains by a pulse on a hairpin conductor overlying an area of magnetization of the polarity of a domain. An input arrangement of this type is shown in my copending application Ser. No. 732,705, filed May 28, 1968, now U.S. Pat. No. 3,534,347. Alternatively, a domain can be generated from a seed domain circulating about the periphery of a magnetically soft overlay disc at I. Such an arrangement is disclosed in copending application Ser. No. 756,210, filed Aug. 29, 1968 for A. J. Perneski, now U.S. Pat. No. 3,555,527. One such suitable input is assumed present at I in FIG. 1 and the drive mechanism is represented by block 30 entitled Input Pulse Source.

Domain patterns so generated and moved in accordance with this invention arrive at output position O in FIG. 1 for detection. One convenient detection arrangement is a conductor loop positioned such that the passage of a domain generates a pulse therein. A second loop may be present for first expanding and then collapsing a domain at the output position. Alternatively, a Hall-effect device as, for example, disclosed in copending application Ser. No. 882,900, filed Dec. 8, 1969 for W. Strauss, may be used. In each instance, a pulse is applied to a utilization circuit represented by block 33 in FIG. 1.

Sources 20, 21, and 30 and circuit 33 may be any such circuits capable of operating in accordance with this invention. The various sources and circuits are connected to a control circuit 34 for synchronization and control.

The invention has been described in terms of overlays of scalloped and straight edge elements on each surface of a slice of material in which single-wall domains can be moved. Of course, overlays of different configuration can be employed. A review of the operation defines the boundary conditions for the alternative configurations. The natural movement of a domain as an in-plane field rotates has been described in connection with FIG. 3, the ends of the domain sweeping out annular paths in the opposite surfaces of slice 11. The overlay geometry functions to constrain, alternatively, the movement of opposite ends of a domain as the end moves to a most advanced position in its annular path. Thus, for example, end $D_b$ of domain D in FIG. 3 is constrained or latched when it arrives at the position shown as is clear from FIGS. 7 and 8.

The latching of the domain in the illustrative embodiment results from an overlay geometry which conforms to the domain geometry and provides a relatively high repelling force to constrain the annular movement of alternative ends of a domain during different portions of a cycle of an in-plane field which fosters that annular movement. The result is the alternate advancement of opposite ends of a domain along the channel. In the illustrative overlay configuration, an overlay element is scalloped to receive the end of the circular domain. The end of the domain is free of a recess only when the inplane field is oriented to permit the wall to move from the engaged position as shown in FIG. 6. The unlatched end of a domain is displaced simultaneously along the straight edge provided by the overlay strip on the opposite side of the slice. The magnetic configuration in which the overlay elements of each face of the slice are alike and repelling to domains and defined in spaced apart overlay elements is designed to ensure the operation as described.

Alternatives to achieve these same ends comprise, for example, variations in the magnetic configuration of the overlay, the mode of reorientation of the in-plane field, and the faces of substrate available for bearing overlays. Firstly, the magnetic configuration of the overlay of the figure may be realized without actually etching the overlay into the spaced apart element geometry shown. To be specific, the magnetic pole configuration of FIG. 2 can be realized with a uniform overlay film in which poles are provided, for example, by Curie point or compensation point writing via coincident laser and magnetic field or by other magnetic writing techniques. An alternative configuration, for example, would employ poles of opposite magnetization (viz, attracting poles) along an axis between the scalloped and straight edges of overlays 12 and 13 and 14 and 15 as indicated by the lines 40 and 41 in FIG. 2. Of course, spaced apart overlay elements need not be employed with such a line of opposite poles. To be specific, the presence of the opposite poles in a continuous overlay embodiment obviates the necessity either for a separate straight edge overlay element or even for a separate straight line of poles to correspond to the straight line edge of that separate overlay because a domain rides along the line of (attracting) opposite poles without any tendency to stray during displacement in accordance with this invention.

The printing of the pole configuration is an important practical consideration because it eliminates the necessity for photolithographic techniques and because the poles can be rewritten easily.

In addition, it is contemplated to move domains in accordance with this invention employing overlays or printed permanent magnets on only one face of a slice of material in which single-wall domains can be moved. One mode of realizing such one-face overlay operation would require high operating speeds where viscous damping would retard the backward movement of an end of a domain at the face of the slice where the overlay is absent while the end of the domain, intersecting the opposite face where the overlay is present, is being moved by the in-plane field reorientation. The end of the domain at the face where the overlay is absent would then be advanced at a relatively slow rate while the opposite end is latched as described above.

It should be understood also that the configuration as shown in FIG. 1 is suitable primarily where domains sweep out the annuli of FIG. 3 as the in-plane field reorients by rotation. But the in-plane field may orient by pulsed techniques which are not necessarily productive of a rotating field. The overlays, of course, are configured or the permanent magnets are printed to correspond to the reorientation mode of the in-plane field to achieve operation as described.

The invention has been described in terms of a relatively weakly anisotropic slice in which the walls of domains are moved in order to permit the attitude of the domain to incline with respect to the normal to the plane of movement. This relationship permits domain movement by coherent rotation rather than by domain wall motion because the fields operate directly on the spins within the body of the domain rather than on the domain wall itself. Motion by coherent rotation is inherently faster than domain wall motion leading to significantly faster bit rates as is well understood in the art with respect to similar advantages in thin magnetic films. The increase is proportional to the ratio of the volume of a domain to the volume of the wall which in the typical case is 10 to 1. Bit rates as high as 100 megahertz are expected to be achieved as is consistent with the following example.

Magnetic domains having a nominal diameter of 5 microns are moved in a slice of $Gd_{2.3}Tb_{0.7}Fe_5O_{12}$ (gadolinium-terbium-garnet) 0.1×0.1×0.002 inch thick and having an anisotropy of 500 oersteds. A bias field of 120 oersteds maintains the domain diameter at the nominal value. An in-plane field of 20 oersteds is rotated at a frequency of 10 megahertz. A permanent magnetic configuration on each of top and bottom faces of the slice is spaced apart 15 microns, the scalloped portion defining 5 micron recesses for latching domains. The overlay comprises a film of $Co_3Cu_2Sm$ (cobalt-copper-samarium) 1 micron thick having a coercive force of 10,000 oersteds into which permanent magnetization directions are set by a computer controlled laser operated in the presence of a magnetic field. The repeat pattern on the overlay has the dimensions 10×30 microns.

What has been described is considered only illustrative of the principles of this invention. Therefore, variations of the invention can be deviced by those skilled in the art in accordance with those principles within the spirit and scope of this invention. For example, it should be recognized that the reversal of the direction of rotation of the in-plane field results in a reversal of domain movement in the channel of FIG. 1. Moreover, a large number of channels of which the channel of FIG. 1 is representative can be defined in identical fashion in slice 11.

What is claimed is:

1. A domain-propagation arrangement comprising a slice of a material in a plane in which single-wall domains can be moved, an overlay adjacent a first surface of said slice and having a coercive force to be only negligibly affected by a magnetic field reorienting in said plane, said slice of material having a sufficiently low anisotropy to permit a change in the inclination of single-wall domains therein with respect to said plane in a manner to follow said reorienting in-plane field, said overlay having a geometry and a magnetic configuration for displacing along a channel in said slice domains the inclination of which are so changed.

2. An arrangement in accordance with claim 1 including said first and a second overlay adjacent first and second surfaces of said slice, each of said overlays comprising spaced apart elements, said elements having permanent magnetization directions to repel said domains in the presence of a reorienting in-plane field, one of said elements in each of said surfaces being of a geometry to constrain an end of domains moving along an axis between said spaced apart elements from an input to an output position, and means for providing a reorienting in-plane field.

3. An arrangement in accordance with claim 1 wherein said first overlay comprises a continuous overlay film, said film including a magnetic configuration unchanging in the presence of a reorienting in-plane field for constraining a first end of said domain during a first part of each cycle of said in-plane field, and means for providing a reorienting in-plane field.

4. An arrangement in accordance with claim 3 also including a second continuous overlay film similar to said first overlay for constraining a second end of said domain during a second part of each cycle of said in-plane field.

5. An arrangement in accordance with claim 1 wherein said first overlay comprises first and second spaced-apart overlay elements having a scalloped and straight edge, respectively, wherein said in-plane field reorients by rotation.

6. An arrangement in accordance with claim 2 wherein each of said first and second overlays comprises a pair of first and second spaced-apart overlay elements, said first elements having scalloped edges and said second elements having straight edges, wherein said in-plane field reorients by rotation.

7. An arrangement in accordance with claim 5 wherein said scalloped and straight edges are spaced apart to define a domain-propagation channel therebetween and are magnetized to repel the end of the domain intersecting the surface of the substrate which said overlay elements abut.

8. An arrangement in accordance with claim 6 wherein said pairs of overlay elements define a domain-propagation channel where the scalloped and straight edges of the elements of each pair are magnetized to repel the ends of domains intersecting the surface which the respective overlay elements abut.

9. An arrangement in accordance with claim 3 wherein said overlay film includes a pattern of permanent magnetization directions for defining a propagation channel, said pattern having a geometry to define a scalloped path of repelling poles and a straight path of attracting poles for domains along said channel, and wherein said in-plane field reorients by rotation.

10. An arrangement in accordance with claim 4 wherein each of said overlay films includes a pattern of permanent magnetization directions for defining a domain-propagation channel, said pattern in each of said overlay films having a geometry to define a scalloped path of repelling poles and a straight path of attracting poles for domains along said channel, and wherein said in-plane field reorients by rotation.

11. An arrangement in accordance with claim 6 wherein said slice comprises a garnet crystal and each of said overlay elements comprises a film of cobalt-copper-samarium.

* * * * *